United States Patent
Han

(10) Patent No.: US 6,867,873 B1
(45) Date of Patent: Mar. 15, 2005

(54) METHOD FOR CONTROLLING ORDER OF PRINT OPERATION FOR A PRINTER

(75) Inventor: Dong-Hyeop Han, Seoul (KR)

(73) Assignee: Samsung Electronics Co., LTD, Suwon-si (KR)

( * ) Notice: Subject to any disclaimer, the term of this patent is extended or adjusted under 35 U.S.C. 154(b) by 0 days.

(21) Appl. No.: 09/567,119

(22) Filed: May 8, 2000

(30) Foreign Application Priority Data

May 7, 1999 (KR) .......................................... 1999 16295

(51) Int. Cl.[7] ............................. G06F 3/12; G06F 13/00
(52) U.S. Cl. ..................... 358/1.12; 358/1.15; 358/1.14
(58) Field of Search .................................. 358/1.1–1.18, 358/1.9, 1.12, 1.14, 1.15, 1.16, 1.17, 3.12

(56) References Cited

U.S. PATENT DOCUMENTS 6,226,097 B1 * 5/2001 Kimura ..................... 358/1.14

* cited by examiner

Primary Examiner—Gabriel Garcia
Assistant Examiner—Douglas Tran
(74) Attorney, Agent, or Firm—Robert E. Bushnell, Esq.

(57) ABSTRACT

A method for controlling the order of print operations for a printer comprises the following steps of: determining whether a printer engine is performing a print operation if print operation information has been received from one or more computers connected to a network; storing the print operation information if the printer engine is performing the print operation; requesting a computer that has transmitted the print operation information to transmit print data if the printer engine is not performing the print operation, and initializing a counter if the print data is received from the computer; counting a print time period and determining whether the counted time period exceeds a predetermined print time period; detecting print operation information, which satisfies a predetermined condition, from stored print operation information if a counted time period exceeds a predetermined print time period; stopping temporarily the print operation for the print data transmitted from the computer if the print operation information which satisfies a predetermined condition is detected, and receiving print data from the computer and printing the print data; receiving continuously print data from the computer and resuming the temporarily stopped print operation, if the print operation is completed.

20 Claims, 6 Drawing Sheets

| NO | Print operation request PC address | Print data size | print operation request time |
|---|---|---|---|
| 1 | 165.213.105.88 | 3,498,400 | 09:37 |
| 2 | 165.213.105.69 | 1,068 | 09:42 |
| 3 | 165.213.105.70 | 20,064 | 09:50 |
| 4 | 165.213.105.78 | 766,690 | 09:57 |
| 5 | | | |
| 6 | | | |
| 7 | | | |
| 8 | | | |
| . . . | | | |

Fig. 5

METHOD FOR CONTROLLING ORDER OF PRINT OPERATION FOR A PRINTER

CLAIM OF PRIORITY

This application makes reference to, incorporates the same herein, and claims all benefits accruing under 35 U.S.C. §119 from my application METHOD FOR CONTROLLING ORDER OF PRINT JOB IN PRINTER filed with the Korean Industrial Property Office on 7 May 1999 and there duly assigned Serial No. 16295/1999.

BACKGROUND OF THE INVENTION

1. Field of the Invention

The present invention relates to a method for controlling the order of print operations for a printer and, more particularly, to a method for controlling the order of print operations for a printer, which is capable of primarily performing the print operation that has stood by for more than a predetermined time period and has the print data less than a predetermined size after calculating standby time periods for print and receiving the size information of printing data from computers that transmitted print requesting commands.

2. Description of the Related Art

As well known to those skilled in the art, a network is a communication structure in which two or more communication apparatuses are interconnected for the purpose of data communication and serves to transmit data between interconnected apparatuses. In this structure, transmitting and switching apparatuses as well as computers are interconnected by a communication line. The network may be classified into the Internet, a Local Area Network (LAN) and a Wide Area Network (WAN), depending upon its covering area. The Internet is a network in which networks are interconnected all over the world, the LAN is a network in which communication apparatuses are interconnected in a local area, and the WAN is a network in which communication apparatuses are interconnected in a wide area.

As computer networking technology is developed and services using the technology are increased, the operating systems of computers have progressed to Network Operating System (NOS) and Distributed Operation System (DOS).

In the meantime, a printer is an apparatus that receives print data from data transmitting apparatuses such as personal computers and prints the print data in the form of a document. Such a printer may be classified into a network printer or a computer-connected printer, depending upon the use of the printer. The network printer is directly connected to the network, while the computer-connected printer is connected to a computer connected to a network. The former has a network card for allowing communication to be possible.

In such a network operating system, when one or more computers request a network printer to print, the network printer receives print data and prints the print data, depending on the order of requests for printing.

That is, when a user selects a print command so as to output print data processed in various application programs via the network printer, the central processing unit of the computer transmits the print data by means of performing a spooling function.

The network computer performs a print operation after the receipt of the print data transmitted from a computer, and determines whether there are other print commands after the completion of the printing of the print data. When the network printer receives print commands from one or more computers, the printer performs print operations in the order of the receipt of print commands.

However, since the conventional print operation order controlling method allows the printer to perform print operations in the order of the receipt of print commands when the network printer receives print commands from one or more computers, the other computers that have transmitted the print commands should be in a spooling state. In such a case, when print data that is being printed currently is great in size, the standby time period for the other computers is lengthened, while the standby print data is very small in size, inconvenience in use and a waste of time are caused.

SUMMARY OF THE INVENTION

Accordingly, the present invention has been made keeping in mind the above problems occurring in the prior art, and an object of the present invention is to provide a method for controlling the order of print operations for a printer, which is capable of primarily performing the print operation that has stood by for more than a predetermined time period and has the print data less than a predetermined size after calculating standby time periods for printing and receiving the size information of print data from computers that transmitted print requesting commands, thereby allowing print operations to be performed effectively.

It is also an object to provide a network of computers connected to a single printer where a large print job can be interrupted so that smaller print jobs can be executed without excess delay.

In order to accomplish the above objects, the present invention provides a method for controlling the order of print operations for a printer, comprising the steps of: determining whether a printer engine is performing a print operation if print operation information has been received from one or more computers that are connected to a network; storing the print operation information in a memory if the printer engine is performing the print operation; requesting a computer that has transmitted the print operation information to transmit print data if the printer engine is not performing the print operation, and initializing a counter for counting a print time period if the print data is received from the computer; counting a print time period while the print data received from the computer is being printed, and determining whether the counted time period exceeds a predetermined print time period; detecting print operation information, which satisfies a predetermined condition, from print operation information stored in the memory if a counted time period exceeds a predetermined print time period; stopping temporarily the printing operation for the print data transmitted from the computer if the print operation information which satisfies a predetermined condition is detected, and receiving print data from the computer that transmitted the print operation information and printing the print data; and receiving continuously print data from the computer and resuming the temporarily stopped print operation, if the print operation is completed.

Preferably, each of the print operation information includes at least the IP address of a computer and the size of print data, and print operation request time, that is, time when the print operation information is received, is stored together with the print operation information when the print operation information is stored. Preferably, the predetermined condition includes a criterial standby time period and a criterial print data size.

Preferably, the step of detecting print operation information that satisfies the predetermined condition includes the steps of: detecting standby print time periods with regard to time, when the print operations were requested, from the print operation information stored in the memory, and detecting print operation information whose standby time periods exceed the criterial standby time period; and detecting sizes of print data from the detected print operation information and detecting from the detected print operation information print operation information whose sizes exceed the criterial print data size, if print operation information whose standby time periods exceed the criterial standby time period is detected. Preferably, print operation information having a least-sized print data is detected if two or more items of detected print operation information satisfy the predetermined condition. Preferably, print operation information having a longest print standby time period is detected if two or more items of detected print operation information satisfying the predetermined condition.

Preferably, the method further comprises the steps of transmitting a standby requesting command to the computer if print operation information satisfying the predetermined condition is detected, determining whether the standby requesting command is approved by the computer, and printing the detected print operation information if the standby requesting command is approved.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein:

FIGS. 3-1 and 3-2 illustrate a flowchart showing a control procedure for the network printer;

FIG. 5 is an example illustrating the contents of print operation information.

DETAILED DESCRIPTION OF THE PREFERRED EMBODIMENTS

Figure 1:
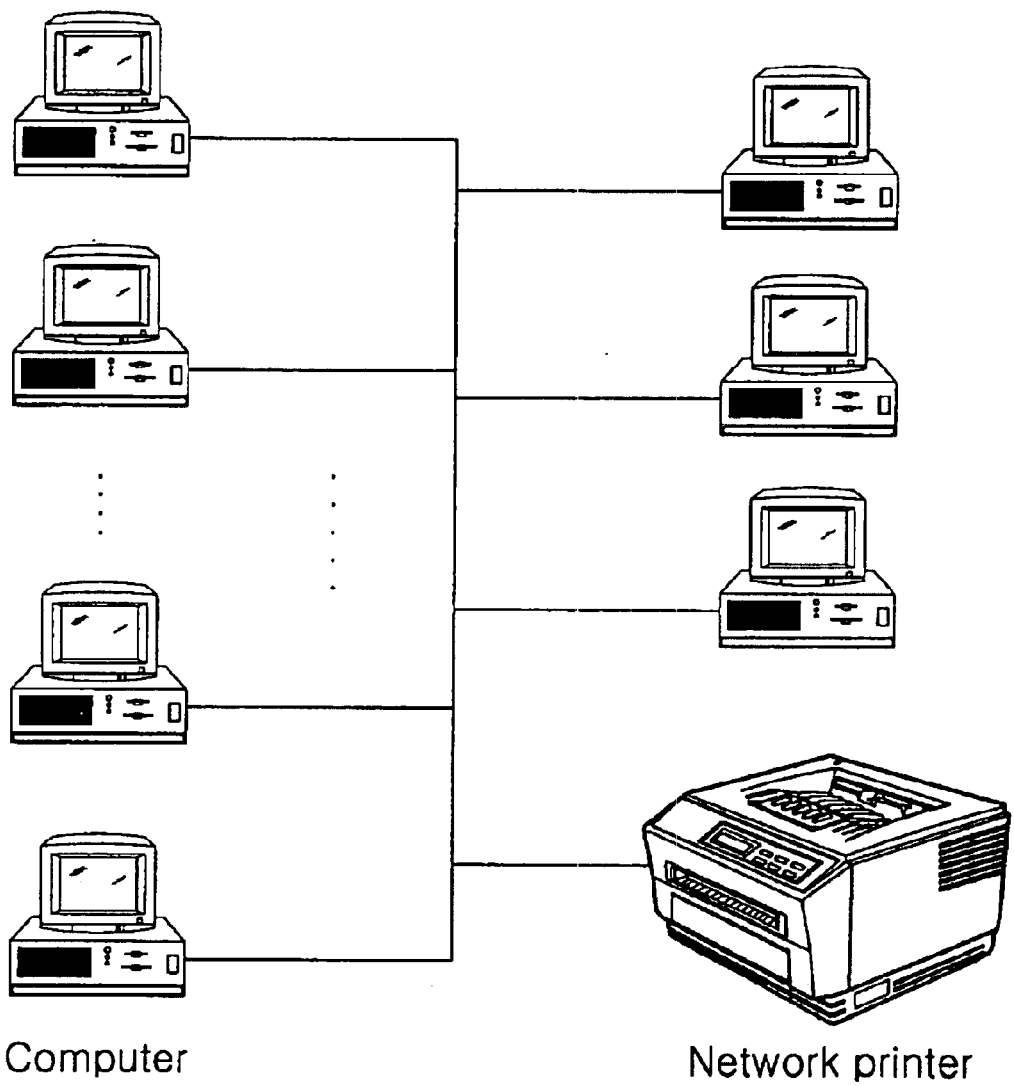
FIG. 1 is a schematic diagram in which connection between a plurality of computers and a network printer is illustrated.

In the following, a preferred embodiment of the present invention is described in detail with reference to FIGS. 1 to 5. As illustrated in FIG. 1, one or more personal computers and one network printer are respectively connected to a network.

Figure 2:
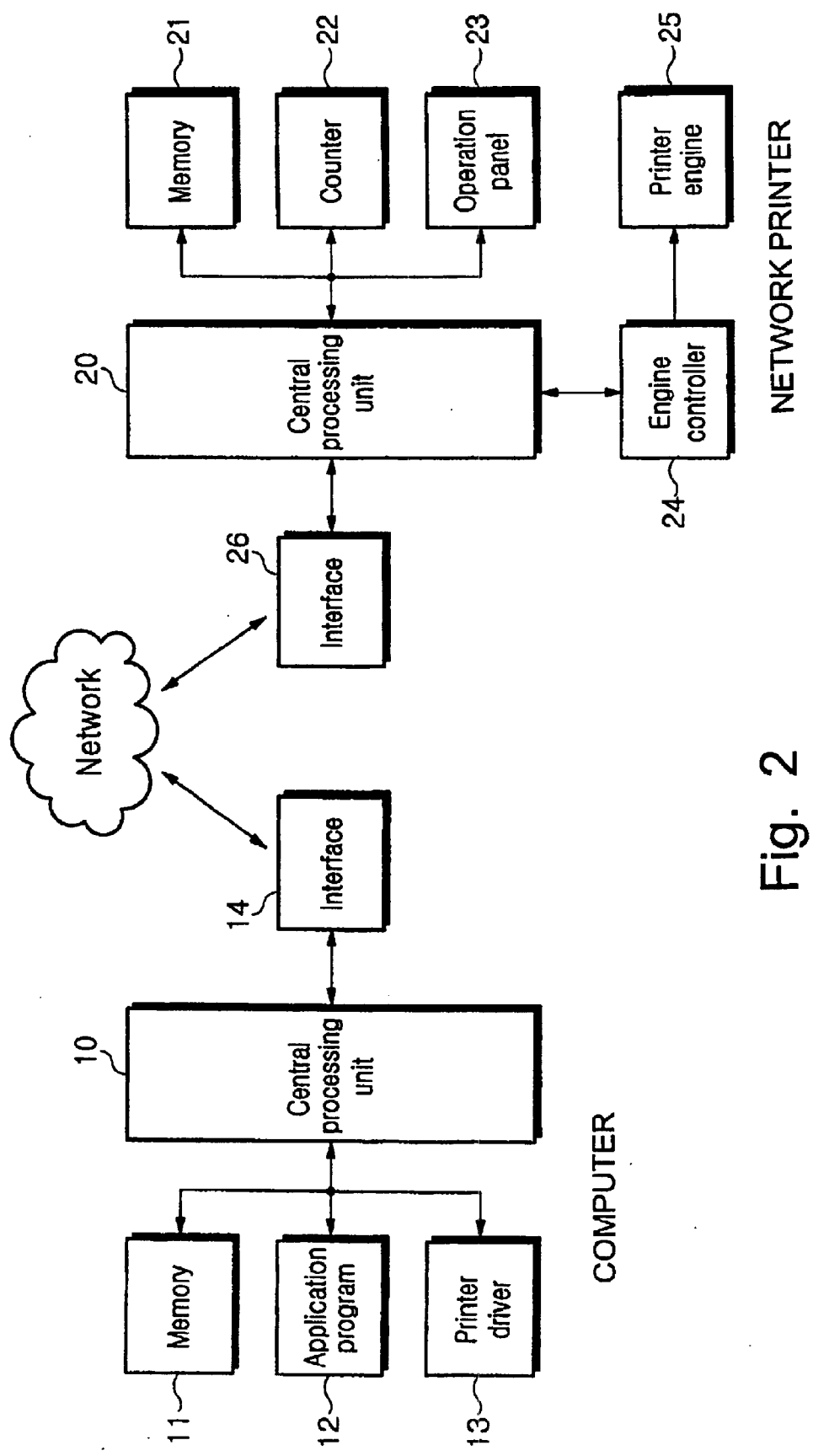
FIG. 2 is a block diagram showing the constructions of the printer and the computer in detail.

Referring to FIG. 2, a central processing unit 10 of the computer controls the entire computer. In particular, the central processing unit 10 controls the size information of print data processed in an application program 12 to be transmitted to the network printer primarily, and controls spooled data to be transmitted to the network printer when the central processing unit 10 receives from the network printer a command for requesting the transmission of print data. A memory 11 stores processed data and various programs according to the control of the central processing unit 10 of the computer. The application program 12 is a program that is capable of making out various documents. A printer driver 13 is a program that converts print data prepared in the application program 12 to the data suitable for the network printer and transmits the converted data to the network printer. An interface 14 is a port for connecting the computer to the network. The interface 14 serves to transmit the size information of print data prepared in the application program 12 and the data converted in the printer driver 13 to the network printer.

A central processing unit 20 of the network computer controls the entire network printer. In particular, in a preferred embodiment of the present invention, the central processing unit 20 controls print operation information to be detected, controls the computer that satisfies predetermined print conditions to be detected, and controls the detected computer to transmit a command for requesting the transmission of print data to the network printer, when the time period for which a printer engine 25 has performed a print operation for certain print data exceeds a predetermined time period. A memory 21 stores various control programs required for realizing the functions of the printer and data generated in the process of performing the programs, and in particular, print operation information that has been received from the computers. As shown in FIG. 5, each item of the print operation information includes the IP address of the computer that requested the print operation, the size information of print data, and time when the computer requested the print operation. In accordance with the control of the central processing unit 20, a counter 22 counts a time period for which the printer engine 25 has performed the print operation and inputs the time period to the central processing unit 20.

An operation panel 23 comprises a plurality of keys and a display. The operation panel 23 serves to input key data, which are generated when the keys are pressed, to the central processing unit 20 and to display the operating status of the network printer in accordance with the display data of the central processing unit 20. In accordance with the control of the central processing unit 20, an engine controller 24 actuates the printer engine 25, and transmits the print data stored in the memory 21 to the printer engine 25. The printer engine 25 serves to perform the print operation using the print data transmitted from the engine controller 24.

An interface 26 is a port for connecting the network printer 2 to the network. The interface 26 serves to transmit a command for requesting the transmission of the print data of a certain size to a computer and to receive the size information of the print data and the print data transmitted from the computers.

Figures 1, 3:
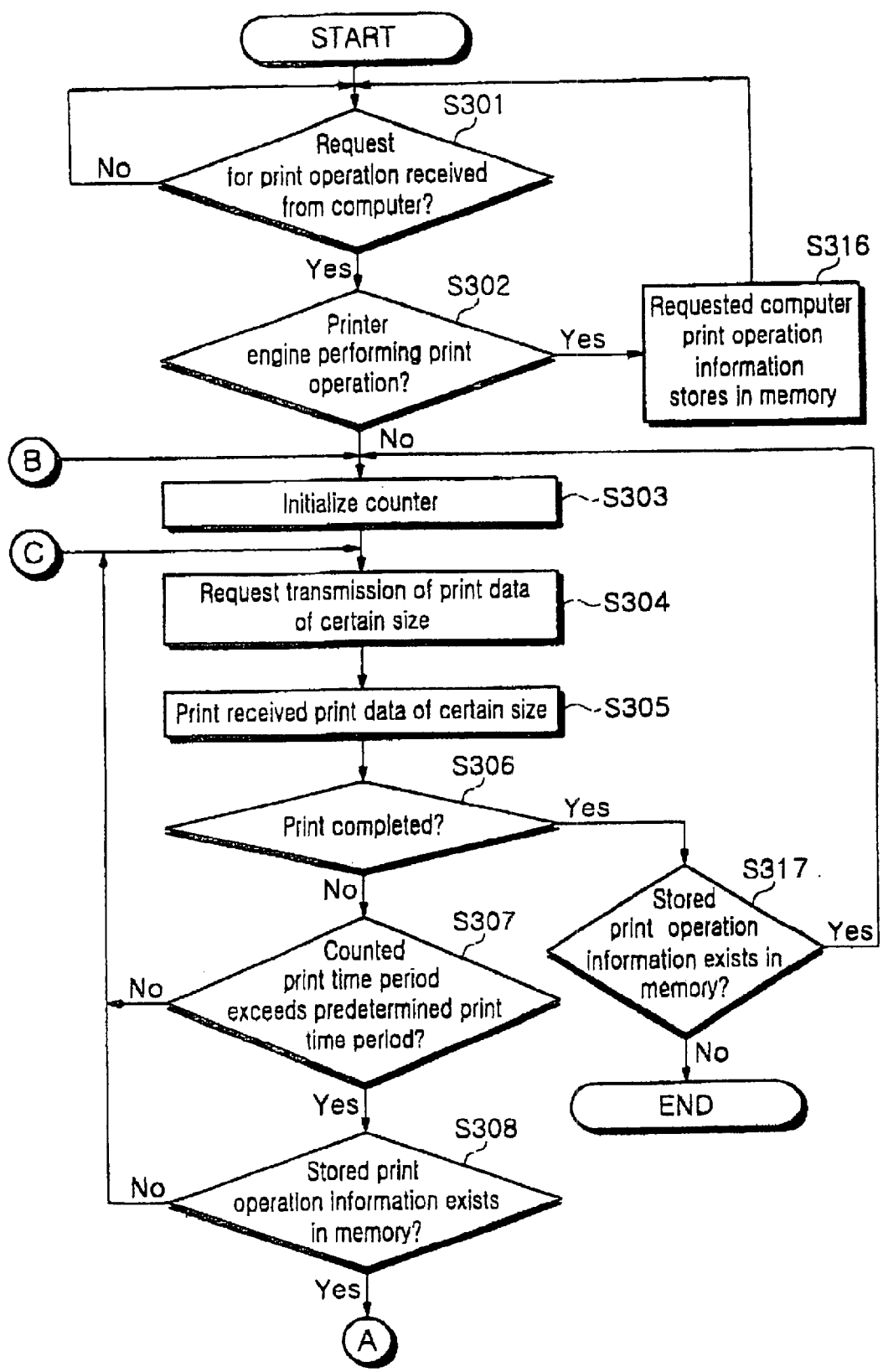
Figure 3:
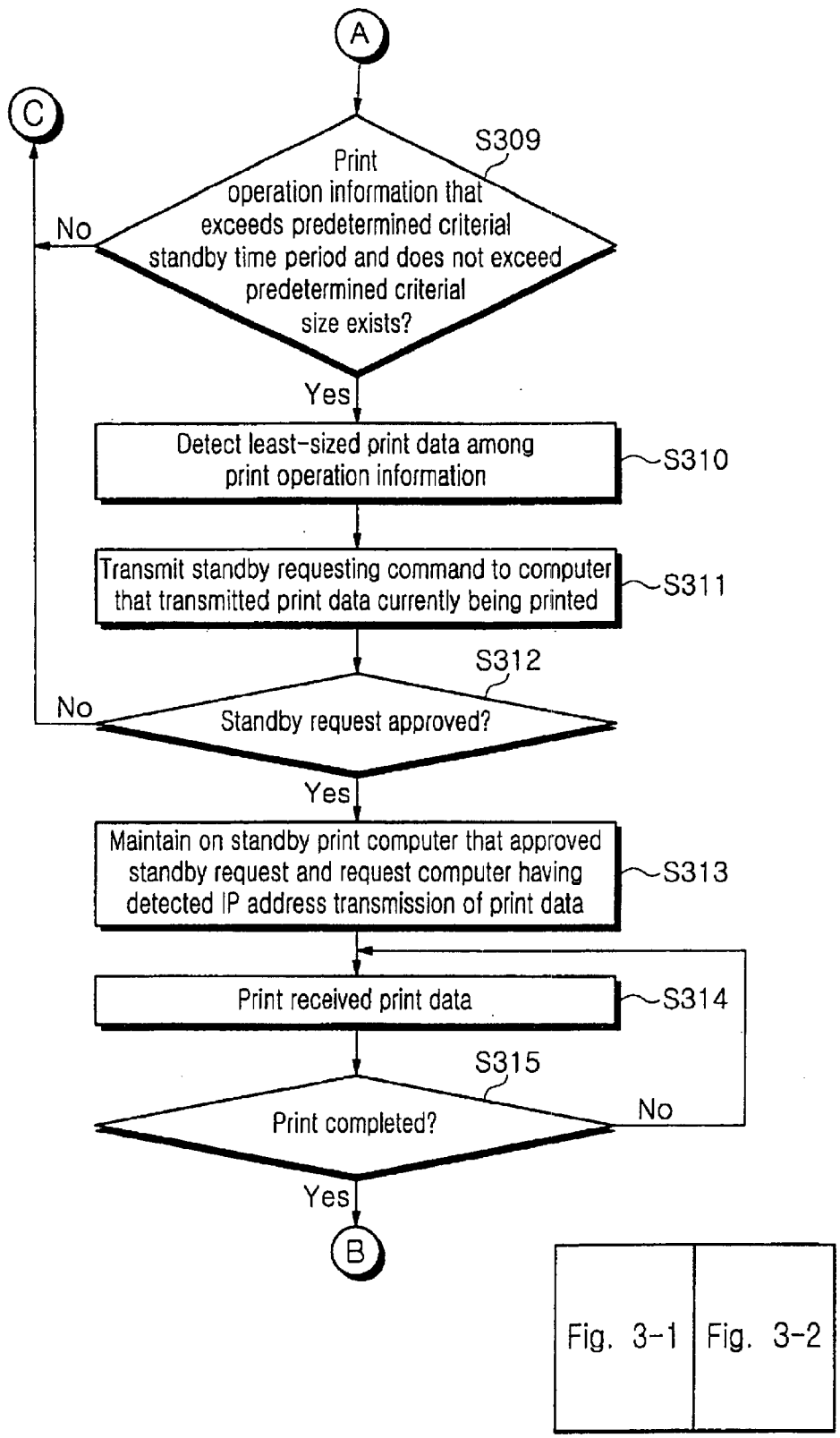
Figure 2:
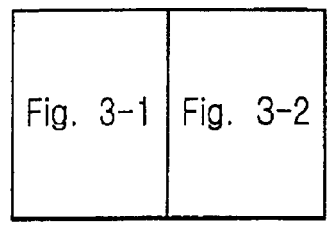

With reference to FIGS. 3 and 5, a control procedure for the network printer is described in the following. First of all, when a command for printing a document prepared in the application program 12 via the network printer is selected, the central processing unit 10 of the computer detects the size information of the corresponding print data and transmits the size information to the network printer.

The central processing unit 20 of the network printer determines whether the print command has been received from the computer through the interface 26 (S301). If the print command has been received, the central processing unit 20 determines whether the printer engine 25 is performing a print operation (S302).

If the printer engine 25 is performing a print operation, the central processing unit 20 stores in the memory 21 the print operation information of the computer that requested the print operation (S316). In such a case, the print operation information includes the IP address of the computer that requested the print operation, the size information of print data, and time when the computer requested the print operation (refer to FIG. 5). After the central processing unit 20 stores the print operation information of the computer that requested the print operation, the central processing unit 20 returns to STEP S301 in which the central processing unit 20 determines whether the print command has been received. If the printer engine 25 is not performing a print operation, the central processing unit 20 initializes the counter 22 (S303) and, thereafter, transmits to a corresponding computer a command for requesting the transmission of its print data (S304).

Thereafter, the central processing unit 20 prints the print data of a certain size, which is received through the interface 26 from the computer 1 that requested the print operation, via the printer engine 25 by controlling the engine controller 24 (S305). The central processing unit 20 determines whether the print operations for all the print data, which have been received from the computers that requested the print operations, are completed (S306). If all the print operations are not completed, the central processing unit 20 determines whether a print time period counted by the counter 22 exceeds the predetermined print time period (S307).

If the print time period counted by the counter 22 exceeds the predetermined print time period, the central processing unit 20 determines whether stored print operation information exists in the memory 21 (S308). Since the print operation information of the computer that requests print operation is stored in the memory 21 when the print operation is requested during the performance of the print operation of the printer engine 25, whether stored print operation information exists in the memory 21 should be determined through STEP 308(S308). If the stored print operation information exists in the memory 21, the central processing unit 20 determines whether print operation information satisfying a predetermined print condition exists among the print operation information stored in the memory 21 (S309). The central processing unit 20 calculates standby time periods for printing by detecting the time, when the computers requested the print operation, from the print operation information stored in the memory 21 and subtracting the detected time from current time, and detects print operation information whose standby time periods exceed a predetermined standby time period. If the print operation information whose standby time periods exceed a predetermined standby time period is detected, the central processing unit 20 detects the sizes of print data from the detected print operation information and detects from the detected print operation information the print operation information whose sizes exceed a predetermined: size.

If there exists print operation information that satisfies two conditions with regard to the predetermined standby time period and size, the central processing unit 20 detects the least-sized print operation information from the print operation information that satisfies the two conditions (S310). On the other hand, if there exist two or more items of print operation information that satisfy two conditions with regard to the predetermined standby time period and size, it may be possible that the central processing unit 20 detects the operation information whose standby time period is longest. Subsequently, the central processing unit 20 transmits a command for requesting a standby to the computer that transmitted the print data printed currently (S311), and determines whether the standby requesting command is approved by the corresponding computer (S312).

If the standby requesting command is approved by the corresponding computer the central processing unit 20 maintains on standby the print operation for the computer that approved the standby requesting command, detects the IP address of the computer from the print operation information detected at STEP S310, and requests the computer having the detected IP address to transmit print data (S313). The central processing unit 20 controls the print data, which is received from the computer detected at STEP 310, to be printed via the printer engine 25 by controlling the engine controller 24 (S314), and determines whether the print operation is completed (S315).

If the print operation is completed, the central processing unit 20 returns to STEP S303 and initializes the counter 22. Thereafter, the central processing unit 20 transmits to a corresponding computer a command for requesting the transmission of the print data, and performs the succeeding STEPs thereof.

If the print time period counted by the counter 22 does not exceed the predetermined time period (NO in STEP S307), the stored print operation information does not exist in the memory 21 (NO in STEP S308), the print operation information satisfying a predetermined print condition exists among the print operation information stored in the memory 21 (NO in STEP S309) or the standby requesting command is not approved by the corresponding computer (NO in STEP S312), the central processing unit 20 returns to STEP S304 and transmits to a corresponding computer a command for requesting the transmission of the print data.

If the print operations for all the print data are completed (YES in STEP S306), the central processing unit 20 determines whether stored print operation information exists in the memory 21 (S317). If the stored print operation information exists in the memory 21, the central processing unit 20 returns to STEP 303 in which the central processing unit 20 initializes the counter 21, and performs the succeeding STEPs thereof. If the stored print operation information does not exist in the memory 21 (NO in STEP 317), the procedure ends.

Figure 4:
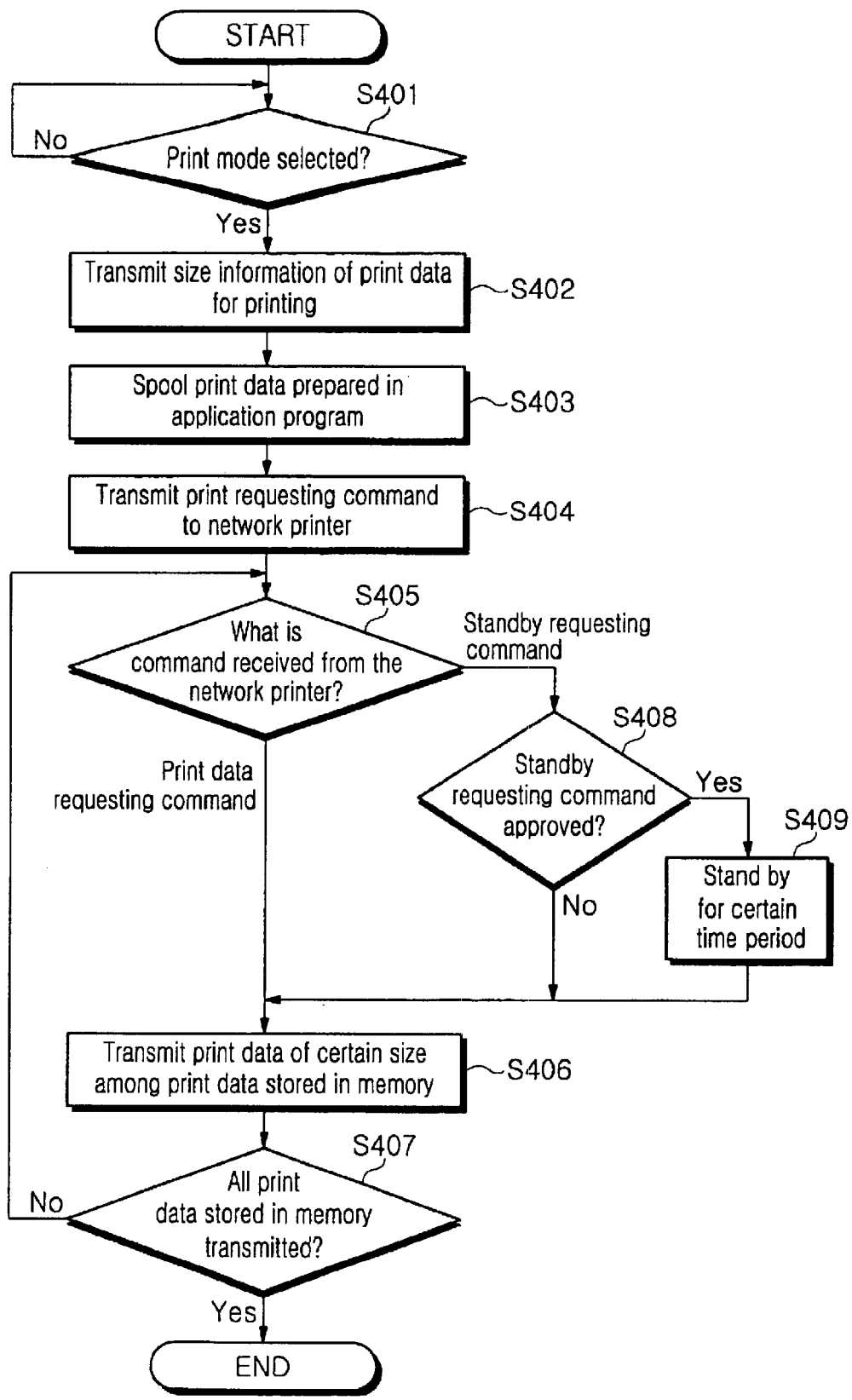
FIG. 4 is a flowchart showing a control procedure for the computer.

With reference to FIG. 4, a control procedure for the computer is described in the following. The central processing unit 10 of the computer determines whether a user has selected a print mode so as to print a document prepared in the application program 12 via the network printer (S401). If the print mode is selected, the central precessing unit 10 transmits the size information of print data to the network printer through the interface 14 (S402) and spools the print data (S403). Thereafter, the central processing unit 10 transmits a print command to the network printer (S404) and determines whether a certain command has been received from the network computer (S405). If the certain command received from the network computer is a command for requesting the transmission of print data, the central processing unit 10 transmits to the network printer the print data of a certain size among print data that are stored in the memory 11 (S406). After the central processing unit 10 transmits the print data of a certain size to the network printer, the central processing unit 10 determines whether all the print data stored in the memory 11 are transmitted (S407).

If any print data exist in the memory 11 (NO in STEP S407), the central processing unit 10 returns to STEP S405 and determines whether a certain command has been received from the network computer. Thereafter, the central processing unit 10 performs the succeeding STEPS thereof.

In the meantime, if a standby command has been received from the network computer, the central processing unit 10 displays a guidance message on the screen of the computer so as to allow a user to select one from the approval or the disapproval of the standby command.

The central processing unit 10 determines whether the user approves the standby command (S408). If the user approves the standby command, the central processing unit 10 stands by for a certain time period (S409) and, thereafter, performs STEP S406 in which the central processing unit 10 transmits to the network printer the print data of a certain size among print data that are stored in the memory 11 in accordance with the command for requesting the transmission of print data that has been received from the network printer.

If the user does not approve the standby command (NO in STEP S408), the central processing unit 10 performs STEP S406 in which the central processing unit 10 transmits to the network printer the print data of a certain size among print data that are stored in the memory 11. Thereafter, the central processing unit 10 performs the succeeding STEPS thereof. Incidentally, if all the print data stored in the memory 11 are transmitted (YES in STEP S407), the procedure ends.

As described above, the present invention provides a method for controlling the order of print operations for a printer, which is capable of primarily performing the print operation that has stood by for more than a predetermined time period and has the print data less than a predetermined size after calculating standby time periods for print and receiving the size information of print data from computers that transmitted print requesting commands, thereby allowing print operations to be performed effectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling the order of print operations for a printer, comprising the steps of:
   determining whether a printer engine is performing a print operation if print operation information has been received from one or more computers that are connected to a network;
   storing the print operation information in a memory if the printer engine is performing the print operation;
   requesting a computer that has transmitted said print operation information to transmit print data if the printer engine is not performing the print operation, and initializing a counter for counting a print time period if the print data is received from the computer;
   counting a print time period while the print data received from the computer is being printed, and determining whether the counted time period exceeds a predetermined print time period;
   detecting print operation information, which satisfies a predetermined condition, from print operation information stored in said memory if a counted time period exceeds a predetermined print time period;
   stopping temporarily the printing operation for the print data transmitted from the computer if the print operation information which satisfies a predetermined condition is detected, and receiving print data from the computer that transmitted the print operation information and printing the print data; and
   receiving continuously print data from the computer and resuming the temporarily stopped print operation, if the print operation is completed.

2. The method according to claim 1, wherein each item of said print operation information includes at least an IP address of a computer and a size of print data, and print operation request time, that is, time when said print operation information is received, is stored together with said print operation information when said print operation information is stored.

3. The method according to claim 1, wherein said predetermined condition includes a criterial standby time period and a criterial print data size.

4. The method according to any of claim 1, wherein said step of detecting print operation information that satisfies said predetermined condition includes the steps of,
   detecting standby print time periods with regard to time, when the print operations were requested, from the print operation information stored in said memory, and detecting print operation information whose standby time periods exceed said criterial standby time period; and
   detecting sizes of print data from the detected print operation information and detecting from said detected print operation information print operation information whose sizes exceed said criterial print data size, if print operation information whose standby time periods exceed said criterial standby time period is detected.

5. The method according to claim 4, wherein print operation information having a least-sized print data is detected if two or more items of detected print operation information satisfy said predetermined condition.

6. The method according to claim 4, wherein print operation information having a longest print standby time period is detected if two or more items of detected print operation information satisfy said predetermined condition is two or more.

7. The method according to claim 1, further comprising;
   transmitting a standby requesting command to said computer if print operation information satisfying said predetermined condition is detected;
   determining whether the standby requesting command is approved by said computer; and
   printing said detected print operation information if the standby requesting command is approved.

8. The method according to any of claim 2, wherein said step of detecting print operation information that satisfies said predetermined condition includes the steps of,
   detecting standby print time periods with regard to time, when the print operations were requested, from the print operation information stored in said memory, and detecting print operation information whose standby time periods exceed said criterial standby time period; and
   detecting sizes of print data from the detected print operation information and detecting from said detected print operation information print operation information whose sizes exceed said criterial print data size, if print operation information whose standby time periods exceed said criterial standby time period is detected.

9. The method according to any of claim 3, wherein said step of detecting print operation information that satisfies said predetermined condition includes the steps of,
   detecting standby print time periods with regard to time, when the print operations were requested, from the print operation information stored in said memory, and detecting print operation information whose standby time periods exceed said criterial standby time period; and detecting sizes of print data from the detected print operation information and detecting from said detected print operation information print operation information whose sizes exceed said criterial print data size, if print operation information whose standby time periods exceed said criterial standby time period is detected.

10. A method for controlling the order of print operations for a printer connected to a network having a plurality of computers, comprising the steps of:

(s-1) determining if a request for a print operation is received from one of said plurality of computers;

(s-2) determining if a printer engine is performing a print operation;

(s-3) storing said request for said print operation in memory if said printer engine is performing said print operation;

(s-4) initializing a counter if said printer engine is not performing said print operation;

(s-5) requesting transmission of print data for said print operation;

(s-6) printing received print data of said print operation;

(s-7) determining if said print operation is completed;

(s-8) determining if print time period exceeds a predetermined time period if said print operation is not completed;

(s-9) determining if print operation information is stored in memory if said print time exceeds said predetermined time period;

(s-10) determining if print operation information exceeds a predetermined criterial standby time period and does not exceed a predetermined criterial size if said print operation information is stored in memory;

(s-11) detecting a least-sized print data among print operation information if print operation information exceeds a predetermined criterial standby time period and does not exceed a predetermined criterial size;

(s-12) transmitting standby requesting command to one of said plurality of computers that transmitted print data is currently being printed;

(s-13) determining if said standby requesting command is approved by said computer;

(s-14) requesting of said computer transmission of print data if said standby requesting command is approved by said computer;

(s-15) print received data;

(s-16) determining if print job is completed; and (s-17) returning to step s-4 if said print job is completed.

11. The method of claim 10, further comprising the step of returning to step s-15 if said print job is not completed in step s-17.

12. The method of claim 11, further comprising the step of returning to step s-5 if said standby requesting command is not approved by said computer in step s-13.

13. The method of claim 12, further comprising the step of returning to step s-5 if print operation information either fails to exceed a predetermined criterial standby time period or exceeds a predetermined criterial size if said print operation information is stored in memory in step s-10.

14. The method of claim 13, further comprising the step of returning to step s-5 if print operation information is not stored in memory in step s-9.

15. The method of claim 14, further comprising the step of returning to step s-5 if print time period does not exceed a predetermined time period of step s-8.

16. The method of claim 15, further comprising the steps of:

determining if stored print operation information exists in memory if said print information is completed in step s-7;

returning to step s-4 if said stored print operation information does exist in memory; and ending process if said stored print operation information does not exist in memory.

17. The method according to claim 16, wherein each item of said print operation information includes at least an IP address of a computer and a size of print data, and print operation request time, that is, time when said print operation information is received, is stored together with said print operation information when said print operation information is stored.

18. The method according to claim 17, wherein said predetermined condition includes a criterial standby time period and a criterial print data size.

19. A method of controlling the order of print operations for a printer connected to a network having a plurality of computers, comprising the steps of:

(s-1) determining when a print mode has been selected by a central processing unit of one of said plurality of computers;

(s-2) transmitting size information by said central processing unit of said computer of print data for printing when said print mode is selected;

(s-3) spooling said print data by said central processing unit of said computer;

(s-4) transmitting a print command to said printer by said central processing unit of said computer;

(s-5) determining whether a print data requesting command or a standby requesting command has been received from said printer;

determining when standby requesting command has been approved when said standby requesting command has been received from said printer in step s-5:

(s-6) transmitting print data of certain size among print data stored in memory from said central processing unit of said computer to said printer when said print data requesting command has been received from said printer;

standing by for a certain time period when said standby requesting command has been approved and then executing step s-6 after said time period expires:

executing step s-6 when said standby requesting command has not been approved:

(s-7) determining, by said central processing unit of said computer, whether all the data stored in memory has been transmitted; and (s-8) ending process when all data stored in memory has been transmitted.

20. The method of claim 19, further comprising the step of returning to step s-5 when all print data stored in memory has not been transmitted in step s-7.

* * * * *